(12) United States Patent  
Hirano

(10) Patent No.: US 9,124,110 B2  
(45) Date of Patent: Sep. 1, 2015

(54) IN-VEHICLE WIRELESS CHARGING SYSTEM

(71) Applicant: KABUSHIKI KAISHA TOKAI RIKA DENKI SEISAKUSHO, Aichi (JP)

(72) Inventor: Yoshihisa Hirano, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 331 days.

(21) Appl. No.: 13/785,464

(22) Filed: Mar. 5, 2013

(65) Prior Publication Data

US 2013/0249478 A1    Sep. 26, 2013

(30) Foreign Application Priority Data

Mar. 21, 2012    (JP) .................................. 2012-063952

(51) Int. Cl.
| | |
|---|---|
| *H02J 7/00* | (2006.01) |
| *H02J 7/02* | (2006.01) |
| *H02K 7/02* | (2006.01) |
| *H02J 5/00* | (2006.01) |

(52) U.S. Cl.
   CPC .............. *H02J 7/0047* (2013.01); *H02J 7/0044* (2013.01); *H02J 7/027* (2013.01); *H02K 7/025* (2013.01); *H02J 5/005* (2013.01)

(58) Field of Classification Search
   CPC .... Y02T 10/7077; H02J 5/005; H02J 7/0047; H02J 7/025; H02J 7/027
   USPC .......................................................... 320/108
   See application file for complete search history.

(56) References Cited

U.S. PATENT DOCUMENTS

| | | | | |
|---|---|---|---|---|
| 6,316,909 | B1* | 11/2001 | Honda et al. ................... | 320/108 |
| 6,924,735 | B2* | 8/2005 | Ueda et al. ............... | 340/426.28 |
| 7,769,346 | B1* | 8/2010 | Van Order et al. ........... | 455/41.2 |
| 7,795,841 | B2* | 9/2010 | Matsumoto .................... | 320/109 |
| 2012/0161696 | A1* | 6/2012 | Cook et al. ..................... | 320/108 |
| 2013/0335023 | A1* | 12/2013 | Radin ........................... | 320/109 |

FOREIGN PATENT DOCUMENTS

| | | |
|---|---|---|
| JP | 2008-005573 | 1/2008 |
| JP | 2009-296780 | 12/2009 |
| JP | 2010-259172 | 11/2010 |

OTHER PUBLICATIONS

U.S. Appl. No. 13/854,394 to Yoshihisa Hirano, filed Apr. 1, 2013.
Japanese Office Action for Application No. JP2012-063952, mailed Jul. 7, 2015.

* cited by examiner

*Primary Examiner* — M'Baye Diao
(74) *Attorney, Agent, or Firm* — Greenblum & Bernstein, P.L.C.

(57) ABSTRACT

An in-vehicle wireless charging system including a warning unit that generates a warning notifying a user that a vehicle is in a situation inappropriate for the user to leave the vehicle when a door opens under a situation inappropriate for the user to leave the vehicle. The warning unit is constantly supplied with power. A wireless charging device supplies power to a charged device set at a predetermined charge location in the vehicle. A first switch detects whether or not the charged device is set at the charge location. The warning unit generates the warning notifying the user that the vehicle is in a situation inappropriate for the user to leave the vehicle when the door opens under a situation in which the charged device has been determined from the detection of the first switch as being set at the charge location.

4 Claims, 1 Drawing Sheet

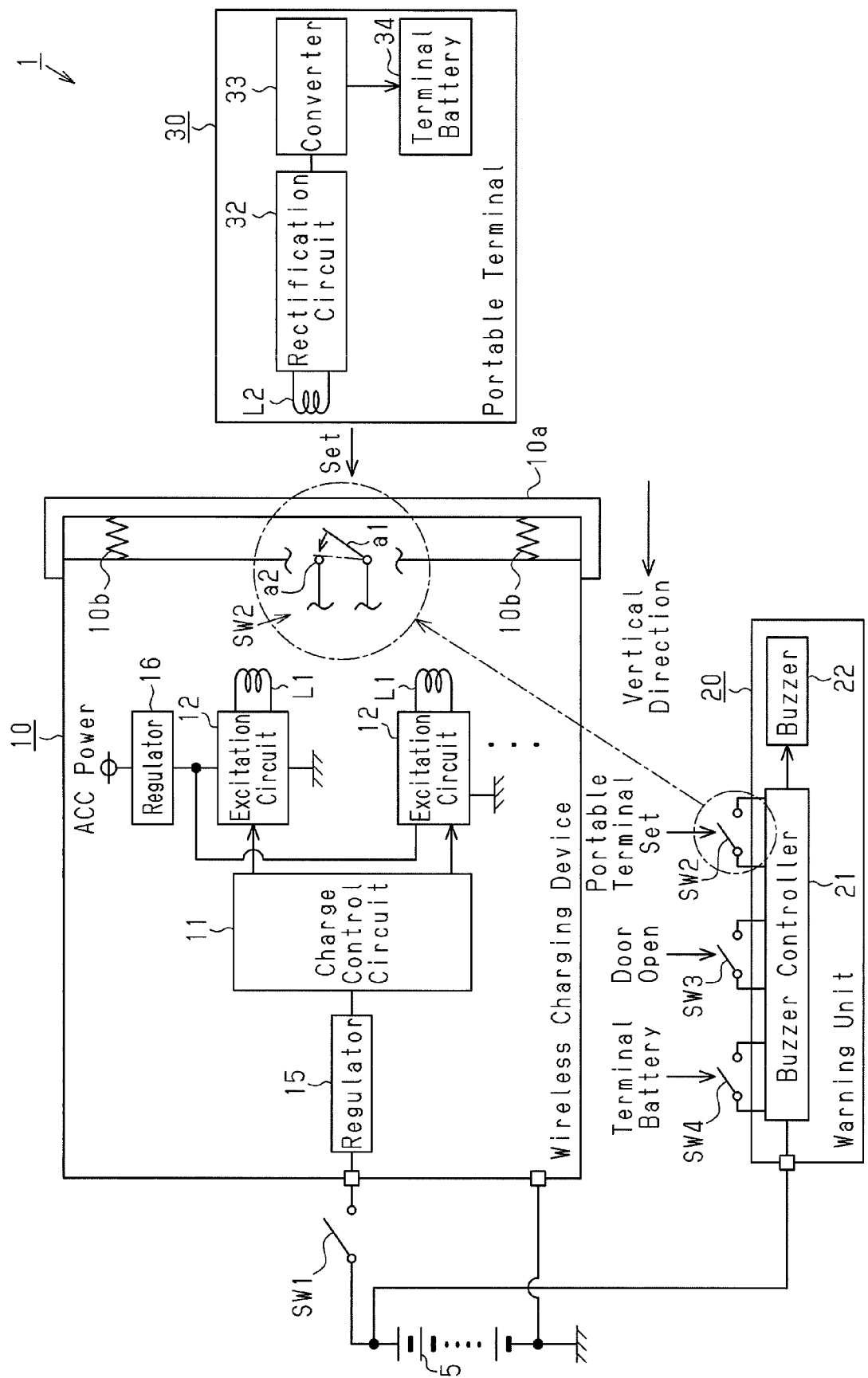

IN-VEHICLE WIRELESS CHARGING SYSTEM

CROSS-REFERENCE TO RELATED APPLICATIONS

This application is based upon and claims the benefit of priority from prior Japanese Patent Application No. 2012-063952, filed on Mar. 21, 2012, the entire contents of which are incorporated herein by reference.

BACKGROUND ART

The present invention relates to an in-vehicle wireless charging system.

A wireless charging device transmits power to a charged device in a wireless manner to charge the charged device (refer to, for example, Japanese Laid-Open Patent Publication No. 2008-5573). More specifically, the charging device includes a primary coil, and the charged device includes a secondary coil. A power transmission pad is formed on an upper surface of the charging device. The charged device is set on the power transmission pad. When excited, the primary coil generates low-frequency radio waves (electromagnetic waves), which induce power at the secondary coil. The power charges a battery that is incorporated in the charged device.

The wireless charging device performs polling to determine whether or not the charged device has been set on the power transmission pad before charging the charged device. The wireless charging device starts charging the charging device after having determined through polling that the charged device has been set on the power transmission pad (refer to, for example, Japanese Laid-Open Patent Publication No. 2010-259172).

Wireless charging devices for use in vehicles are being developed so that portable terminals, or charged devices, can be charged in the vehicles. When a wireless charging device is installed in a vehicle, a user may forget and leave the portable terminal on the power transmission pad of the wireless charging device. In this case, it is desirable that a warning be generated to notify the user that the portable terminal is being left in the vehicle. Such a warning can be generated, for example, when the wireless charging device performs polling and detects the presence of the portable terminal on the power transmission pad as the user stops the engine and opens the door to leave the vehicle. However, this would result in the wireless charging device requiring an additional warning means such as a buzzer. Further, in addition to information such as whether the headlights are left on, the vehicle will also be required to obtain information such as whether the door is open or closed for the wireless charging device. This may result in complex wiring and control.

SUMMARY OF THE INVENTION

It is an object of the present invention to provide an in-vehicle wireless charging system including a simple structure that generates a warning for notifying a user that a charged device is being left in a vehicle.

One aspect of the present invention is an in-vehicle wireless charging system including a warning unit that generates a warning notifying a user that a vehicle is in a situation inappropriate for the user to leave the vehicle when a door of the vehicle opens under a situation inappropriate for the user to leave the vehicle. The warning unit is constantly supplied with power. A wireless charging device supplies power in a wireless manner to a charged device set at a predetermined charge location in the vehicle. A first switch detects whether or not the charged device is set at the charge location. The warning unit generates the warning notifying the user that the vehicle is in a situation inappropriate for the user to leave the vehicle when the door opens under a situation in which the charged device has been determined from the detection of the first switch as being set at the charge location.

BRIEF DESCRIPTION OF THE DRAWING

The invention, together with objects and advantages thereof, may best be understood by reference to the following description of the presently preferred embodiments together with the accompanying drawing in which:

FIG. 1 is a block diagram showing an in-vehicle wireless charging system according to one embodiment of the present invention.

DETAILED DESCRIPTION OF THE INVENTION

One embodiment of an in-vehicle wireless charging system according to the present invention will now be described with reference to FIG. 1.

As shown in FIG. 1, an in-vehicle wireless charging system 1 includes a wireless charging device 10, a warning unit 20, and a portable terminal 30.

The wireless charging device 10 and the warning unit 20 are installed in a vehicle. The warning unit 20 is directly connected to a vehicle battery 5. The wireless charging device 10 is connected by an ACC switch SW1 to the vehicle battery 5.

In the present embodiment, a mechanical key (not shown) is inserted into a key cylinder (not shown), which is arranged in the vehicle. The mechanical key is turned in the key cylinder. This switches the vehicle between a power OFF state, an accessory (ACC) ON state, an ignition (IG) ON state, and an engine start state.

The ACC switch SW1 is actuated in the ACC ON state and the IG ON state and de-actuated in the power OFF state and the engine start state. Actuation of the ACC switch SW1 closes the power line from the vehicle battery 5 to the wireless charging device 10. Accordingly, when the vehicle is in the ACC ON state and the IG ON state (ACC power activated), the wireless charging device 10 is supplied with operational power. Further, the warning unit 20 is constantly supplied with power from the vehicle battery 5. The structures and operations of the wireless charging device 10, the warning unit 20, and the portable terminal 30 will now be described.

Wireless Charging Device

The wireless charging device 10 includes a charge control circuit 11, a plurality of excitation circuits 12, a plurality of primary coils L1, two regulators 15 and 16, and a setting detection switch SW2. The number of primary coils L1 matches the number of excitation circuits 12.

Further, the wireless charging device 10 includes an upper surface (right surface as viewed in the drawing). A power transmission pad 10a is formed on the upper surface. The portable terminal 30 can be set on the power transmission pad 10a. The wireless charging device 10 is arranged in the passenger compartment with the power transmission pad 10a in an exposed state.

The power transmission pad 10a includes a lower surface (left surface as viewed in the drawing). The setting detection switch SW2 is arranged on the lower surface. The setting detection switch SW2 includes a movable actuator a1 (first terminal) and a fixed contact a2 (second terminal). Often, the movable actuator a1 is separated from the fixed contact a2. That is, the setting detection switch SW2 is de-actuated.

The power transmission pad 10a is supported by springs 10b on the main body of the wireless charging device 10. When the portable terminal 30 is set on the power transmission pad 10a, the weight of the portable terminal 30 moves the power transmission pad 10a toward a main body of the wireless charging device 10 (leftward as viewed in the drawing) against the elastic force of the springs 10b. The movement of the power transmission pad 10a results in the movable actuator a1 coming into contact with the fixed contact a2 and actuating the setting detection switch SW2.

When the portable terminal 30 is removed from the power transmission pad 10a, the elastic force of the springs 10b moves the power transmission pad 10a away from the main body 10 (rightward as viewed in the drawing). The movement of the power transmission pad 10a separates the movable actuator a1 from the fixed contact a2 and de-actuates the setting detection switch SW2. In this manner, the setting detection switch SW2 includes the movable actuator a1, which moves together with the portable terminal 30 arranged on the power transmission pad 10a, and a fixed contact a2, which is fixed to the wireless charging device 10 and which is allowed to come into contact with the movable actuator a1.

The primary coils L1 are arranged in the wireless charging device 10 along the power transmission pad 10a. The primary coils L1 are connected to the excitation circuits 12, respectively. The excitation circuits 12 are connected between ACC power and ground in accordance with the actuation and de-actuation of the ACC switch SW1. A regulator 16, which generates a constant output voltage, is arranged between the ACC power and the excitation circuits 12. A similar regulator 15 is arranged between the charge control circuit 11 and the ACC switch SW1.

When the ACC switch SW1 is actuated, the regulator 15 is supplied with power from the vehicle battery 5. The regulator 15 generates a constant output voltage based on the power from the vehicle battery 5, and supplies the charge control circuit 11 with the generated constant output voltage. Then, the charge control circuit 11 converts the direct current from the regulator 16 to alternating current with the excitation circuits 12, which supply the alternating current to the corresponding primary coils L1. The alternating current excites the primary coils L1 and generates radio waves (electromagnetic waves).

Portable Terminal

The portable terminal 30 includes a secondary coil L2, a rectification circuit 32, a converter 33, and a terminal battery 34. When the portable terminal 30 is set on the power transmission pad 10a, the axis of the secondary coil L2 is orthogonal to the plane of the power transmission pad 10a. The secondary coil L2 induces current with the electromagnetic waves from the primary coil L1 (electromagnetic induction). The rectification circuit 32 converts the induced alternating current to direct current and supplies the converter 33 with the direct current. The converter 33 raises or lowers its output voltage and supplies the terminal battery 34 with the output voltage. This charges the terminal battery 34.

Warning Unit

The warning unit 20 is installed in the vehicle. In the present embodiment, the warning unit 20 is configured to generate a warning when the portable terminal 30 is left in the vehicle. The warning unit 20 includes a buzzer controller 21 and a buzzer 22.

The buzzer controller 21 is connected to the setting detection switch SW2, a courtesy switch SW3, and a key insertion detection switch SW4. Current is supplied to one terminal of each of the switches SW2 to SW4. When the switches SW2 to SW4 are activated, the buzzer controller 21 is supplied with current from the other contact of each of the switches SW2 to SW4. The buzzer controller 21 determines whether each of the switches SW2 to SW4 are actuated or de-actuated based on the current from each of the switches SW2 to SW4.

The courtesy switch SW3 is actuated when the door opens and de-actuated when the door closes. The key insertion detection switch SW4 is actuated when the mechanical key is inserted into the key cylinder and de-actuated when the mechanical key is not inserted into the key cylinder. As described above, the setting detection switch SW2 is actuated when the portable terminal 30 is set on the power transmission pad 10a and de-actuated when the portable terminal 30 is not set on the power transmission pad 10a.

Operation of Buzzer Controller

The buzzer controller 21 determines from the actuation and de-actuation of the switches SW2 to SW4 whether the vehicle is in a situation inappropriate for the user to leave the vehicle. When having determining that the vehicle is in a situation inappropriate for the user to leave the vehicle, the buzzer controller 21 supplies current to the buzzer 22 to generate a buzzing sound and thereby notify the user of such a situation.

More specifically, when the courtesy switch SW3 is actuated (door opened) during actuation of the key insertion detection switch SW4, the buzzer controller 21 makes a determination that the user is about to leave the vehicle with the mechanical key left in the key cylinder. Thus, the buzzer controller 21 generates a buzzing sound with the buzzer 22 to notify the user of such a situation. This reminds the user not to forget the mechanical key in the vehicle.

When the courtesy switch SW3 is activated (door opened) during actuation of the setting detection switch SW2, the buzzer controller 21 makes a determination that the user is about to leave the vehicle with the portable terminal 30 left on the power transmission pad 10a. Thus, the buzzer controller 21 generates a buzzing sound with the buzzer 22 to notify the user of such a situation. This reminds the user not to forget the portable terminal 30 in the vehicle.

The above embodiment has the advantages described below.

(1) A vehicle typically includes a warning unit that generates a warning when the vehicle is in a situation inappropriate for the user to leave the vehicle, such as when the door is opened in a state in which the mechanical key is in the key cylinder. In the above embodiment, the warning unit 20 is used to remind the user not to forget the portable terminal 30 in the vehicle. More specifically, the setting detection switch SW2 detects whether the portable terminal 30 is set on the power transmission pad 10a. When having determined that the portable terminal 30 is set on the power transmission pad 10a from the detection result of the setting detection switch SW2 and, at the same time, the door is open, the warning unit 20 makes a determination that the vehicle is in a situation inappropriate for the user to leave the vehicle and generates a warning to notify the user of such a situation. This allows the user to be aware that the portable terminal has been left in the vehicle. In this manner, by using the conventional warning unit 20, a warning for notifying a user that the portable terminal 30 is being left in the vehicle can be generated with a simple structure that does not require additional components except for the setting detection switch SW2.

(2) The contactless charging device 10 is operated by the ACC power, which supplies power in accordance with the state of the ACC switch SW1. When the user leaves the vehicle, the ACC power is deactivated (ACC switch SW1 de-actuated), and power is not supplied to the wireless charging device 10. This decreases the power consumption of the wireless charging device 10 and the vehicle battery 5. Further, even when the ACC power is deactivated, the warning unit 20 is supplied with power. This allows the warning unit 20 to generate a warning that notifies the user of the portable terminal 30 left in the vehicle when the user opens the door to exit the vehicle.

(3) There is no need for adding to the wireless charging device 10 a new buzzer that generates a buzzing sound as a warning notifying the user of the portable terminal 30.

It should be apparent to those skilled in the art that the present invention may be embodied in many other specific forms without departing from the spirit or scope of the invention. Particularly, it should be understood that the present invention may be embodied in the following forms.

In the above embodiment, the number and type of the switches connected to the buzzer controller 21 is not limited. For example, a headlight switch, which is actuated and de-actuated in accordance with whether the headlights are turned on or off, may be connected to the buzzer controller 21. In this case, when the door opens during actuation of the head light switch, the buzzer controller 21 generates a buzzing sound as a warning to notify the user that the headlights are left on.

In the above embodiment, the wireless charging device 10 is supplied with ACC power. However, in the same manner as the warning unit 20, the wireless charging device 10 may be constantly supplied with power from the vehicle battery 5. In the same manner as the above embodiment, a warning is generated when the door opens in a state in which the portable terminal 30 is set on the power transmission pad 10*a*.

In the above embodiment, the vehicle state is switched by turning the mechanical key in the key cylinder. However, an electronic key system may be employed instead in which the vehicle states are switched by operating a starter switch in the vehicle when wireless communication is established in the vehicle between the electronic key and the vehicle. In this case, for example, the buzzer controller 21 determines whether or not the authentic electronic key is located in the vehicle based on whether or not wireless communication has been established with the electronic key. When the door opens after having determined that the electronic key is located in the vehicle, the buzzer controller 21 generates a warning notifying the user that the electronic key is being left in the vehicle.

In the above embodiment, the control executed by the charge control circuit 11 does not use the detection result of the setting detection switch SW2. However, the charge control circuit 11 may supply power to the primary coils L1 under the condition that the setting detection switch SW2 is actuated, that is, the portable terminal 30 is set on the power transmission pad 10*a*. This further ensures that the portable terminal 30 is charged when the portable terminal 30 is arranged on the power transmission pad 10*a*.

The present examples and embodiments are to be considered as illustrative and not restrictive, and the invention is not to be limited to the details given herein, but may be modified within the scope and equivalence of the appended claims.

The invention claimed is:

1. An in-vehicle wireless charging system comprising:
    a warning unit that generates a warning notifying a user that a vehicle is in a situation inappropriate for the user to leave the vehicle when a door of the vehicle opens under a situation inappropriate for the user to leave the vehicle, wherein the warning unit is constantly supplied with power;
    a wireless charging device that supplies power in a wireless manner to a charged device set at a predetermined charge location in the vehicle; and
    a first switch that detects whether or not the charged device is set at the charge location,
    wherein the warning unit generates the warning notifying the user that the vehicle is in a situation inappropriate for the user to leave the vehicle when the door opens under a situation in which the charged device has been determined from the detection of the first switch as being set at the charge location.

2. The in-vehicle wireless charging system according to claim 1, wherein the wireless charging device is operated by accessory power of the vehicle.

3. The in-vehicle wireless charging system according to claim 1, further comprising
    a second switch that detects when the door opens,
    wherein the warning unit generates the warning notifying the user that the vehicle is in a situation inappropriate for the user to leave the vehicle when the second switch detects that the door has been opened while the first switch detects that the charged device is set at the charge location.

4. The in-vehicle wireless charging system according to claim 1, wherein the first switch includes:
    a first terminal moved together with the charged device that is set at the charge location; and
    a second terminal fixed to the wireless charging device in a manner allowing for contact with the first terminal.

\* \* \* \* \*